Patented May 12, 1953

2,638,431

UNITED STATES PATENT OFFICE 2,638,431

2-NORCAMPHANEMETHANOL AND 2-NOR-CAMPHANEMETHOXYETHANOL APPLIED TO PLANTS TO INHIBIT FUNGOUS GROWTHS

John B. Harry, Hastings on Hudson, N. Y., assignor to Union Carbide and Carbon Corporation, a corporation of New York No Drawing. Application November 30, 1950, Serial No. 198,481

3 Claims. (Cl. 167—30)

This invention relates to the treatment of plants with certain chemical products which have been found to have the property of being absorbed by the roots of plants and of being spread through the plants by the conducting system of the plant to inhibit infection by, or the development of, parasitic growths within the host plant. The plants are treated by introducing the chemicals into the plants, preferably through the root system and by applying the materials together with water to the medium in which the plants are growing.

Desirable plants are often adversely affected by parasites which cannot very well be killed or inhibited by sprays or other applications of toxicants to the surfaces of the plants; for instance tomato and carnation are internally attacked by a disease known as Fusarium wilt. In this disease the conducting system of the host plant is blocked by the growth of the parasite thereby preventing the translocation of food and water to the various parts of the host. Also, the parasite produces materials which are toxic to the host plant. Heretofore, attempts to control the disease have been by sanitation, that is sterilizing the soil, benches, etc. but this has been costly and none too satisfactory.

It is now found that this type of disease can successfully be controlled by an internal treatment of the host plant by getting into the plant one of the chemicals hereafter described as desirable. This is most easily accomplished by dissolving or suspending the chemical in water and watering the plants with such aqueous compositions, preferably by applying the treated water to the soil in which the plant is growing, thus enabling the plant to more readily absorb the chemical and avoiding complications which may arise because of contact of the chemical with an extended area of the plant surface. This method of applying the chemicals is particularly adapted to hothouse operations, for instance the growing of carnations. However, the chemicals may thus be applied wherever plants are watered, for instance by irrigation or otherwise.

The materials which have this unique property are:

(1) 2-norcamphanemethanol having the formula

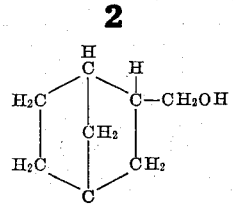

and (2) 2-norcamphanemethoxyethanol having the formula

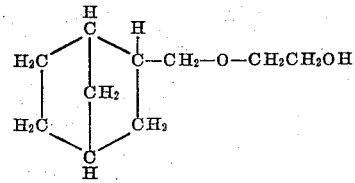

A related material which, it would seem, should give somewhat equivalent results but which failed on test is:

(3) Bicyclo(2,2,1)-5-heptene-2-methanol having the formula

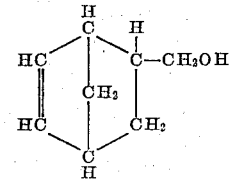

The materials are given the indicative numerals 1, 2, and 3 for reference herein.

The above materials were given greenhouse tests on tomatoes as internal parasiticides against the tomato wilt organism Fusarium lycopersici. Briefly, this test comprises growing individually potted plants in sand which is sterile so far as the wilt organism is concerned. The plants, throughout the test, are fed with nutrient solutions containing the major and minor elements necessary for normal plant development. When the plants are about 4 to 6 inches high, they are watered with aqueous solutions or suspensions of the chemicals under test. The watering is for 10 successive working days and the solution is applied at the rate of 12.5 gallons per 100 square feet (1 pint per square foot). Additional water, but containing none of the chemical, is applied as necessary for normal plant growth. Just before the eleventh watering is due, the plants are removed from the sand, thoroughly washed (including the roots), one or more of the roots is injured so that the wilt organism can quite readily enter the plant, and the plants are replanted in individual pots in fresh sand which contains none of the chemical and is sterile as to the parasite. A suspension of spores of the parasite is then poured on the sand. Thereafter, the plants are watered with sufficient water and nutrients for normal growth but containing none of the chemical under test. Check plants are similarly treated except that the water applied to them never contains a test chemical. The test is considered as completed after the check plants are killed by the disease, the wilt organism being a fungus which grows within the host plant. The tomato plants used in this test were of the variety Bonny Best.

The following table gives the results of this test. The number in the left column indicates the material having the corresponding number previously given to it herein. The data in the center column are the concentrations of the chemical in the aqueous solution or suspension applied to the sand in treating the plants, the ratio 1:4,000 meaning, for instance that the aqueous solution was 1 part by weight of the chemical in 4,000 parts by weight of water. The data in the right column are the disease grades of the plants at the completion of the test, "1" representing the disease grade of the check plants and "0" representing no disease. For practical purposes, a material should have an index number or rating of 0.2 or less.

Table

| Code No. | Concentration Applied | Index |
|---|---|---|
| (1) | 1: 4,000 | 0.00 |
|  | 1: 8,000 | 0.16 |
|  | 1:16,000 | 0.79 |
|  | 1:32,000 | 1.24 |
| (2) | 1: 2,000 | 0.12 |
| (3) | 1: 4,000 | ¹0.71 |

¹ Average.

As is evident from the foregoing, the first two materials are quite effective but the third material is not effective. Material No. 1 is approximately four times as effective as material No. 2 and is preferred.

Material No. 1 proved to be so very effective in the tomato tests that it was tested against *Fusarium dianthi*, a wilt organism which attacks carnations. In these tests, carnation cuttings were rooted and then transplanted to soil in benches in the manner used for raising carnations for market. The soil was naturally infected with the wilt organism. After benching, the plants were watered twice a week with a 1:16,000 solution of material No. 1 at the rate of 1 pint per square foot for 8 weeks. Other waterings were as necessary for normal plant growth with water containing none of the chemical. Check plants were given the same treatment except that the water used for them contained none of the chemical. Approximately 100 plants were used in the test bench, planted about 4 inches apart, and the same number of check plants were used in a bench of the same size.

Counts made 3½ months after treatments stopped showed that 23% of the plants receiving the solution of material No. 1 had the wilt while 44% of the check plants had the wilt.

In another test, the growing procedure being in accordance with usual commercial practice, cuttings of carnations were made, planted in rooting beds until rooted, transplanted into flats and allowed to grow until about 12 inches high, and then transplanted into production beds or benches for final growth and flowering. For the test, during the time that the plants were in the flats (approximately 4 months) they were watered once a week with a 1:16,000 solution of material No. 1 at the rate of 1 pint per square foot of soil surface. Other waterings, with water containing no added chemical, were as necessary to maintain normal plant growth. All of the plantings were in soil naturally infected with the carnation wilt organism. Check plants were grown in the same manner but the water used for them contained none of the chemical. Counts made when the first flowers were ready for market (approximately 8 months after the rooted cuttings were planted in the flats) showed that only 2.85% of the plants treated with material No. 1 had the wilt while 50.6% of the check plants had the disease.

The carnations used in the above tests were Miller's Yellow and the waterings with the aqueous solutions of the chemical were made by applying the solutions on the surface of the soil under the plants.

The materials referred to herein may be prepared in the following manner:

Example 1

Material No. 1, 2-norcamphanemethanol, was prepared by hydrogenating a mixture containing 300 grams of bicyclo(2,2,1)-5-heptene-2-methanol, 300 cc. of ethanol and 25 grams of Raney nickel at 40°–55° C. and a pressure of 500–1000 pounds per square inch. The reactants were held under these conditions for 15 minutes. Upon removal of the reacted mass from the hydrogenating vessel, the norcamphanemethanol was purified by distillation under reduced pressure. The purified product, 2-norcamphanemethanol is a colorless liquid having a boiling point of 83° C. at a pressure of 5 mm. of mercury and a specific gravity of 1.005 at 20°/20°.

Example 2

Material No. 2, 2-norcamphanemethoxyethanol, was prepared by hydrogenating a mixture containing 320 grams of bicyclo(2,2,1)-5-heptene-2-methoxyethanol, 400 cc. of ethanol and 30 grams of Raney nickel at 70°–90° C. and a pressure of 600–1020 pounds per square inch. The reactants were held under these conditions for 3 hours. Upon removal of the reacted mass from the hydrogenating vessel, the norcamphanemethoxyethanol was purified by distillation under reduced pressure. The purified product, 2-norcamphanemethoxyethanol, is a colorless liquid having a boiling point of 103°–105° C. at a pressure of 2 mm. of mercury and a specific gravity of 1.026 at 20°/20°.

Example 3

Material No. 3, bicyclo(2,2,1)-5-heptene-2-methanol, was prepared by heating a mixture of 261.5 grams of allyl alcohol and 238.5 grams of dicyclopentadiene at 175° C. for 6 hours under a pressure of 500 pounds per square inch. The heptene methanol was purified by distillation under reduced pressure. The purified product, bicyclo(2,2,1)-5-heptene-2-methanol, is a colorless liquid having a boiling point of 60° C. at a pressure of 1 mm. of mercury and a specific gravity of 1.028 at 20°/20° C.

The bicyclo(2,2,1) - 5 - heptene-2-methoxyethanol, one of the reactants of Example 2, was prepared by adding 3 moles of ethylene oxide, at the rate of 60 grams per hour, to 10 moles of bicyclo(2,2,1)-5-heptene-2-methanol in which 5 grams of sodium hydroxide were dissolved. During the addition of the ethylene oxide the temperature was maintained at 100°–105° C. The reaction occurred at atmospheric pressure. The sodium hydroxide in the reacted mass was neutralized by adding 15 grams of tartaric acid dissolved in 50 cc. of water. The bicyclo(2,2,1)-5-heptene-2-methoxyethanol was purified by distillation under reduced pressure. The purified product is a colorless liquid having a boiling point of 84°–85° C. at a pressure of 3 mm. of mercury and a specific gravity of 1.043 at 20°/20°.

What is claimed is:

1. Method of inhibiting fungous growths within a plant which comprises applying into the conducting system of a plant subject to fungous attack, a compound of the group consisting of 2-norcamphanemethanol and 2-norcamphanemethoxyethanol in an amount effective in inhibiting the fungous growths.

2. Method of inhibiting fungous growths within a plant which comprises applying to the roots of a plant subject to fungous attack, water together with a compound of the group consisting of 2-norcamphanemethanol and 2-norcamphanemethoxyethanol in an amount effective in inhibiting the fungous growths.

3. Method of inhibiting fungous growths within a plant which comprises applying to the soil in which a plant subject to fungous attack is growing and in the presence of water, a compound of the group consisting of 2-norcamphanemethanol and 2-norcamphanemethoxyethanol in an amount effective in inhibiting the fungous growths.

JOHN B. HARRY.

References Cited in the file of this patent

UNITED STATES PATENTS

| Number | Name | Date |
|---|---|---|
| 422,544 | Schmidt | Mar. 4, 1890 |
| 2,475,288 | Ladd | July 5, 1949 |

OTHER REFERENCES

Newman, Abstract, application Number 68,048, October 17, 1950 (639 O. G. 935.)